United States Patent [19]

Kraus

[11] Patent Number: 4,482,046
[45] Date of Patent: Nov. 13, 1984

[54] FLEXIBLE TROUGH VIBRATORY CONVEYOR

[75] Inventor: Richard B. Kraus, Barrington, Ill.

[73] Assignee: General Kinematics Corporation, Barrington, Ill.

[21] Appl. No.: 368,503

[22] Filed: Apr. 15, 1982

[51] Int. Cl.³ ............................................. B65G 27/00
[52] U.S. Cl. .................................................. 198/771
[58] Field of Search ........................ 198/771, 752, 754

[56] References Cited

U.S. PATENT DOCUMENTS

| | | | |
|---|---|---|---|
| 2,795,318 | 6/1957 | Morris | 198/771 |
| 3,087,602 | 4/1963 | Hinkle, Jr. | 198/771 |
| 3,101,831 | 8/1963 | Gaddini | 198/771 |
| 3,263,802 | 8/1966 | Haley | 198/764 |

Primary Examiner—Joseph E. Valenza
Assistant Examiner—Kyle E. Shane
Attorney, Agent, or Firm—Wood, Dalton, Phillips Mason & Rowe

[57] ABSTRACT

A vibratory conveyor for conveying material. The vibratory conveyor has a conveyor with a conveyor frame and means for vibrating the conveyor relative to the base. The conveyor frame mounts a flexible trough which can flex and change its static shape as the conveyor frame is vibrated. The flexible trough is defined by a material-conveying flexible member attached along opposite edges thereof to side members of the conveyor frame and having a major part thereof extended therebetween which flexes and changes its static shape as the conveyor frame is vibrated.

3 Claims, 5 Drawing Figures

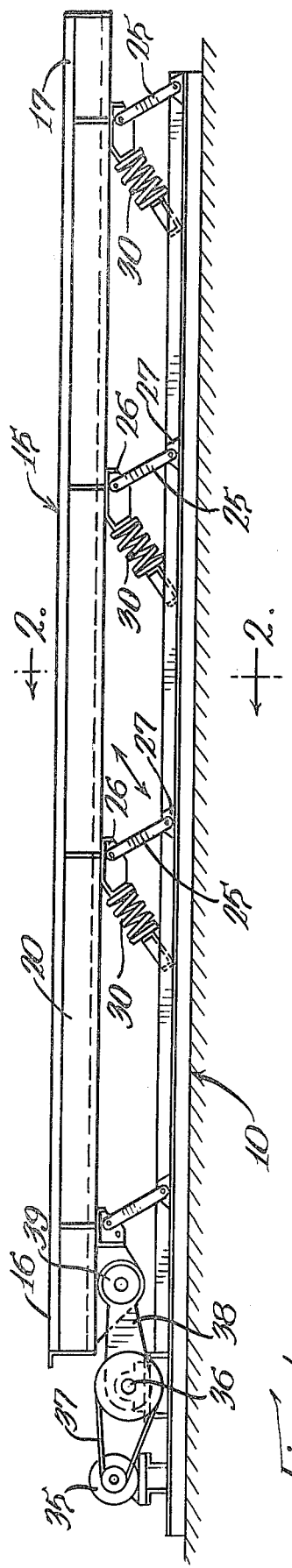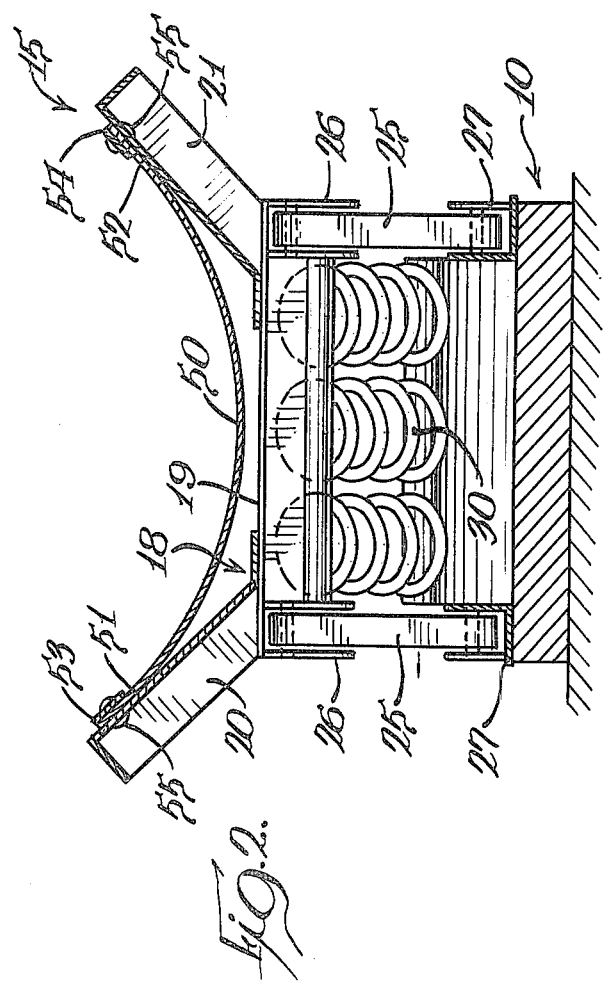

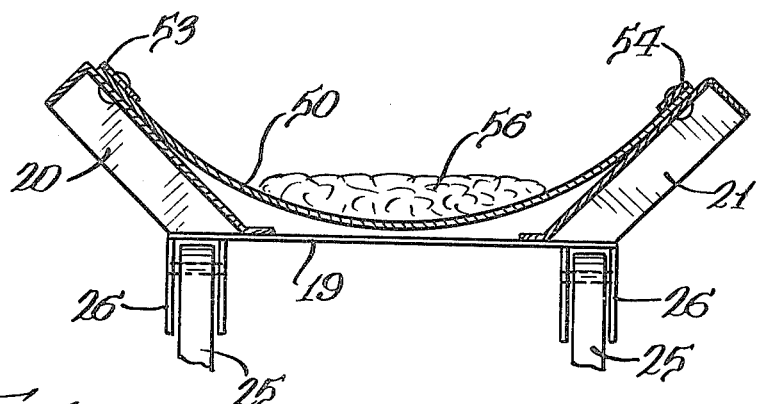
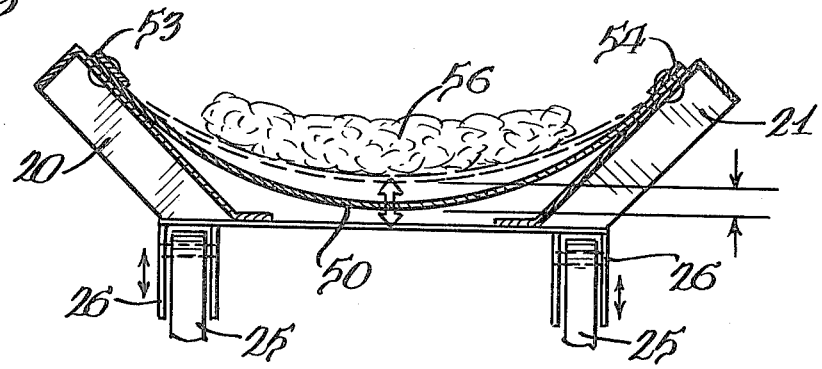
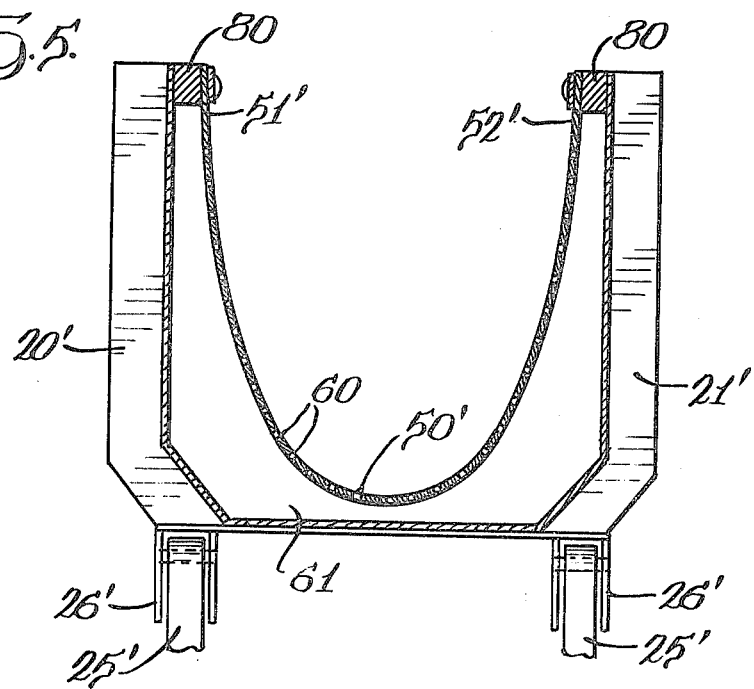

FLEXIBLE TROUGH VIBRATORY CONVEYOR

DESCRIPTION

1. Technical Field

This invention relates to vibratory conveyors and, more particularly, to a vibratory conveyor having a flexible trough which supports the conveyed material and improves the conveying action of the vibratory conveyor.

2. Background Art

A typical vibratory conveyor has a rigid trough with a bottom and upwardly-extending side walls and is vibrated for advancing material from a loading end to a discharge end. The vibratory conveyor moves the material through a controlled vibratory motion of the trough and is extensively used in the conveying of a variety of materials and objects.

Certain problems are encountered when a vibratory conveyor with a rigid trough is used to convey certain types of materials, such as damp, sticky foundry sand or materials that have an adhesive quality. One problem is the tendency for the material to build up and adhere to the surface of the trough, reducing the conveying action thereof through the controlled vibratory motion.

The present invention is directed to overcoming the problems set forth above as well as providing added versatility to the vibratory conveyor.

DISCLOSURE OF THE INVENTION

In the preferred forms of the present invention, the vibratory conveyor has an elongated conveyor with a conveyor frame, drive means for vibrating the conveyor frame relative to a base and the conveyor frame having a flexible trough defined by a material-conveying flexible membrane attached to the conveyor frame and which flexes and changes its static shape as the conveyor frame is vibrated.

The vibratory conveyor with the flexible trough provides for increased conveyability of the material with reduction in dynamic impact loads and improves the conveying action of certain materials, such as damp, sticky foundry sand or materials having an adhesive quality that are difficult to handle and which materials tend to build up and adhere to the surfaces of a conveyor.

More particularly, the material-conveying flexible membrane is in the form of a flexible member, such as belting used in conveyor belting, sturdy, woven material, light gauge flexible steel membranes, fiber reinforced flexible plastic sheeting or the like. The flexible member extends lengthwise of the conveyor frame and has opposite edges thereof secured to the conveyor frame at locations wherein the material is substantially tangent to the frame and with a major part of the material being free to flex and to change its static shape as the conveyor is vibrated. The flexible material can have its major part extending generally horizontally between the locations of attachment to the conveyor frame or can be curved downwardly in the form of a catenary curve.

As the conveyor vibrates, the flexible member will flex in a constantly-changing configuration which will increase the frictional surface in contact with the material being conveyed. The changing cross-sectional shape of the flexible member will tend to wedge the conveyed material between the sloped sides of the flexible trough to thereby increase the frictional engagement between the conveyed material and the flexible trough and thereby increase the conveying effect. In the conveying of fine material, as the flexible member flexes, the conveyed material is thrust upward with the flexible member loosening the adhesion or bond therebetween and sucking air under the material and, as the conveyed material settles back on the surface of the flexible trough, the air is pumped out through the conveyed material and out on the sides of the conveyed material.

The present invention enables the use of further optional refinements whereby air or water may be supplied to a chamber beneath the flexible member for cooling or heating of the flexible member and material being conveyed thereon. The flexible member may be perforated with perforations of a size to prevent passage of material that is being conveyed therethrough but of a size to permit air-flow from the chamber beneath the membrane for cooling of the conveyed material.

BRIEF DESCRIPTION OF DRAWINGS

FIG. 1 is a side elevation of the apparatus;

FIG. 2 is a vertical section, taken generally along the line 2—2 in FIG. 1 and on an enlarged scale;

FIG. 3 is a diagrammatic view of the structure shown in FIG. 2 and with material to be conveyed shown in a position of repose in the flexible trough;

FIG. 4 is a view, similar to FIG. 3, showing a position of the conveyor and material at one point during the conveying operation;

FIG. 5 is a view, similar to FIG. 3, of a second embodiment of the invention.

DESCRIPTION OF THE PREFERRED EMBODIMENTS

An exemplary embodiment of a vibratory conveyor made according to the invention is illustrated in FIGS. 1 and 2. A horizontal base 10 is supported on a fixed surface with a conveyor 15 positioned above the base. The conveyor 15 has a loading end 16 and a discharge end 17.

The conveyor 15 has a conveyor frame 18 including a transverse panel 19 extending lengthwise of the conveyor and a pair of spaced-apart side members 20 and 21 which are secured to the panel 19 at their lower ends adjacent opposite sides thereof and extend upwardly and outwardly therefrom. A plurality of links 25 arranged in laterally-spaced pairs are pivotally connected at their upper ends to brackets 26 secured to the underside of the panel 19 and at their lower ends to brackets 27 secured to the base 10. A plurality of sets of transversely-spaced springs 30 extend between the base 10 and the conveyor panel 19 and the combination of links 25 and springs 30 limit the movement of the conveyor 15 to a path generally inclined to the horizontal so that material carried by the conveyor will be moved in the direction of inclination when the conveyor is vibrated.

Means for imparting vibratory movement to the conveyor 15 comprises an electric motor 35 mounted on the base 10 and driving a rotatable crankshaft 36 by means of a belt drive 37. A crank arm 38 is connected to the crankshaft 36 at one end and is pivotally connected at 39 to the conveyor 15 at its other end. Rotation of the motor 35 and of the crankshaft 31 imparts a vibratory movement to the conveyor.

With the motor 35 in operation, material introduced onto the conveyor 15 at the loading end 16 is caused to move toward the right, as viewed in FIG. 1, by vibration of the conveyor with ultimate discharge of the material at the discharge end 17.

The conveyor 15 has a flexible trough defined by a material-carrying flexible membrane or member 50. This member is formed of a flexible material, such as any material that will flex under the vibratory action of the conveyor frame 19. Typical materials for the flexible member would be belting used for a belt drive, a sturdy, woven fabric, light gauge flexible steel membranes, fiber reinforced plastic sheeting or the like. The flexible member can flex and change its static shape as the conveyor 15 vibrates, but has substantially little or no elongation when loaded with material.

The flexible member 50 extends lengthwise of the conveyor and has opposite edges 51 and 52 extending into tangential contact with the frame side members 20 and 21 and secured at the locations of contact by attaching strips 53 and 54, respectively, which overlie the edges of the flexible member and hold said edges in engagement with the frame side members. Suitable fastening means, such as bolts 55, extend through the fastening members 52 and 53 and the frame side members for holding the parts in secured relation. The flexible member has its major part downwardly-curved in the form of a catenary curve and even when loaded with material to be conveyed it will not contact the underlying panel 19.

Referring to FIGS. 3 and 4, two different operative conditions are shown during conveying of the material. In FIG. 3, the flexible member 50 is shown in its lowermost, static position with material 56 collected in the lower curved part thereof. In FIG. 4, the conveyor 15 is shown in a different operative position wherein the conveyor frame 18 is being vibrated and the conveyed material 56 has an upward acceleration along with the flexed flexible member which combine to break the adhesive bond between the flexible member and between particles of the conveyed material. Subsequently, the material will again settle on the flexible member 50. The continuous flexing of the flexible member, as the adhesion or bond between particles of the material and between the material and the flexible member is broken, will draw air into and under the material on the upstroke of the vibrations and will pump the air out through the material and from below the material on the downstroke of the vibrations. It will be evident that the shape of the mass of material being conveyed will vary depending upon the cycling of the conveyor as well as the nature of the material being conveyed. During the cycling of the conveyor, the flexible member constantly changes its configuration due to the flexing of the flexible member imparted thereto by the vibrations of the conveyor frame. The constantly changing configuration of the flexible member contributes to the conveying action of a number of different types of materials including damp, sticky foundry sand, and other materials having adhesive qualities wherein the flexure reduces the tendency of particles of the material to adhere to each other and reduces the build-up and adherence of the material on the trough.

In one preferred embodiment, the flexible member 50 is downwardly-curved in the form of a catenary curve with the sides of the flexible trough in parallel relation. Improved results can also be achieved with the flexible member 50 extending generally horizontal between its points of securement at opposite edges to the conveyor frame side members 20 and 21.

Another embodiment is shown in FIG. 5, with parts similar to those in FIGS. 1 to 4 given the same reference numeral with a prime affixed thereto. The flexible member 50' has its opposite edges 51' and 52' mounted to spacers 80 on the conveyor frame side members 20', 21' at locations whereby the flexible trough has substantially parallel side walls. In this embodiment, the flexible member 50' may be perforate with openings 60 which are of a sufficiently small size as to prevent passage of particles of material being conveyed therethrough but which still permit flow of air from a chamber 61 enclosed beneath the flexible member. The chamber 61 has end walls (not shown) coacting with the side members 20' and 21' which interconnect to define an enclosed chamber which can have suitable connections to an air supply. Cool air directed to the chamber 61 can flow through the openings 60 for cooling of the material being conveyed. The flexible member 50' can be perforate in any of the disclosed embodiments. In the embodiment of FIG. 5, the flexible member 50' can be imperforate and the chamber 61 can be provided with a fluid for heating or cooling the flexible member and material being conveyed thereby without passage of such fluid to the upper side of the flexible member.

INDUSTRIAL APPLICABILITY

The improved vibratory conveyor with the flexible trough provides for increased conveyability of material by reducing dynamic impact loads and providing a wedging action between the material and the sides of the flexible trough with resulting increased friction therebetween and increased conveying effect. The constantly-changing configuration of the flexible member forming the trough additionally functions to reduce the tendency for certain materials to build up and cake or adhere on the trough.

It is inherent in a vibratory conveyor that there is an action on the conveyed material tending to impel the material upwardly and this action is enhanced by the flexible trough structure. Although not shown, it is evident that a cover can be attached to the conveyor frame side members, as known in the art, whereby the vibratory conveyor can be made dust-tight.

I claim:

1. A vibratory conveyor for conveying material comprising a base, an elongated conveyor having a conveyor frame along which material can travel from a loading end to a discharge end, means for vibrating the conveyor frame to advance material toward said discharge end including means limiting the conveyor frame for movement in a path inclined to the base and means defining a spring reactor system connected between the conveyor frame and the base, said conveyor frame having elongate spaced-apart side members extending lengthwise of the conveyor frame, each side member having edge portions lying parallel to the edge portions of the other side member, said side members extending outwardly and inclined upwardly from said conveyor frame, and an elongate material-conveying flexible member extending substantially horizontally from the loading end to the discharge end of the conveyor, said flexible member being positioned between said side members and having outer edge portions tangent to and secured to the more remote outward portions of the side members with a major part thereof between said outer edge portions hanging downwardly from side to side in a catenary curve and being free to flex and to change its static shape as the conveyor frame is vibrated, said means for vibrating the conveyor frame and the flexible member acting on material on said flexible member to thrust the material upward and forward in movements along the flexible member to loosen the adhesion bond between the flexible member and the material, said material accumulating at the center of the flexible member and deflecting the center of the flexible member downward to increase the slope between the sides and thereby increase the frictional engagement with the material to increase the conveying action of the conveyor.

2. A vibratory conveyor as defined in claim 1 wherein said elongate flexible member has openings therethrough for permitting fluid to flow through the flexible member from below.

3. A vibratory conveyor as defined in claim 2 wherein parts of said conveyor frame beneath said elongate flexible member are enclosed for receiving fluid which can pass through said openings.

* * * * *